US012658678B2

(12) United States Patent　　　　(10) Patent No.:　　US 12,658,678 B2

Sneathen　　　　　　　　　　　　　(45) Date of Patent:　　Jun. 16, 2026

(54) VOLTAGE CONTROLLING APPARATUS AND METHODS OF CALIBRATING A DEVICE

(71) Applicant: Transportation IP Holdings, LLC, Norwalk, CT (US)

(72) Inventor: David Sneathen, Cumberland, MD (US)

(73) Assignee: Transportation IP Holdings, LLC, Norwalk, CT (US)

( * ) Notice: Subject to any disclaimer, the term of this patent is extended or adjusted under 35 U.S.C. 154(b) by 390 days.

(21) Appl. No.: 18/313,120

(22) Filed: May 5, 2023

(65) Prior Publication Data

US 2024/0372338 A1　　Nov. 7, 2024

(51) Int. Cl.
*H02B 1/20*　　　　(2006.01)
*B60R 16/023*　　　(2006.01)

(52) U.S. Cl.
CPC ........... *H02B 1/20* (2013.01); *B60R 16/0231* (2013.01)

(58) Field of Classification Search
CPC .............................. H02B 1/20; B60R 16/0231
USPC ......................................................... 361/622
See application file for complete search history.

(56) References Cited

U.S. PATENT DOCUMENTS

| | | | | | |
|---|---|---|---|---|---|
| 2,208,329 | A | * | 7/1940 | Morelock | G01R 17/16 |
| | | | | | 324/123 R |
| 2,440,287 | A | * | 4/1948 | Oravetz | G01R 31/245 |
| | | | | | 324/412 |
| 2,680,835 | A | * | 6/1954 | Smith | G01R 31/72 |
| | | | | | 324/202 |
| 2,717,190 | A | * | 9/1955 | Shoup | H01J 9/505 |
| | | | | | 445/2 |
| 2,769,928 | A | * | 11/1956 | Emker | G01R 35/04 |
| | | | | | 361/189 |
| 3,176,219 | A | * | 3/1965 | Behr | G01R 27/18 |
| | | | | | 324/508 |
| 3,176,221 | A | * | 3/1965 | Stamler | B64F 5/60 |
| | | | | | 73/304 C |
| 3,532,967 | A | * | 10/1970 | Milton | G01R 31/3277 |
| | | | | | 324/424 |
| 3,568,018 | A | * | 3/1971 | Macdonald | B60L 50/12 |
| | | | | | 318/158 |
| 3,646,438 | A | * | 2/1972 | Staff | B29D 24/00 |
| | | | | | 324/424 |
| 4,105,965 | A | * | 8/1978 | Russell | H02H 3/044 |
| | | | | | 324/424 |
| 4,207,611 | A | * | 6/1980 | Gordon | G01R 31/007 |
| | | | | | 701/33.9 |
| 4,307,345 | A | * | 12/1981 | Schoen | G01R 31/3272 |
| | | | | | 324/424 |
| 4,998,067 | A | * | 3/1991 | Puckett | G01R 31/3277 |
| | | | | | 324/424 |

(Continued)

*Primary Examiner* — Anatoly Vortman

(74) *Attorney, Agent, or Firm* — K&L Gates LLP

(57)　　　　　　ABSTRACT

A voltage controlling apparatus includes a housing, an ammeter, and a voltage adjustment mechanism. The voltage adjustment mechanism is configured to be in electrical communication with a power source and a device, e.g., a vehicle contactor assembly. For calibration of the device, the voltage adjustment mechanism is configured to adjust a voltage being delivered to the device, and the ammeter is configured to display a corresponding current reading of the device in response to adjustment of the voltage to the device.

9 Claims, 10 Drawing Sheets

(56)                    References Cited

U.S. PATENT DOCUMENTS

| | | | | |
|---|---|---|---|---|
| 5,325,315 | A * | 6/1994 | Engel | H01H 47/325 |
| | | | | 702/105 |
| 5,428,294 | A * | 6/1995 | Teel, Jr. | G01R 31/2632 |
| | | | | 324/133 |
| 5,710,513 | A * | 1/1998 | March | G01R 31/3277 |
| | | | | 324/424 |
| 6,612,245 | B2 * | 9/2003 | Kumar | B60L 9/16 |
| | | | | 105/1.4 |
| 11,486,929 | B1 * | 11/2022 | Curtis | G01R 31/3278 |
| 2004/0085071 | A1 * | 5/2004 | Sankey | G01R 31/3278 |
| | | | | 324/418 |
| 2021/0313132 | A1 * | 10/2021 | Del Giudice | H01H 50/12 |

* cited by examiner

VOLTAGE CONTROLLING APPARATUS AND METHODS OF CALIBRATING A DEVICE

BACKGROUND

Technical Field

Embodiments of the invention relate generally to a voltage controlling apparatus. Other embodiments relate to methods for calibrating devices connected to a voltage controlling apparatus.

Discussion of Art

Forms of transportation (e.g., vehicles), machinery, and other assemblies often utilize a combination of electrical and mechanical systems for operation. A vehicle may include a braking system, and the braking system can in turn include a combination of electrical and mechanical systems to apply the required braking for the vehicle. Rail vehicles, for example, utilize a dynamic braking system in combination with an air braking system. Incorporating a dynamic braking system reduces wear on friction-based components (e.g., brake shoes/pads) of the air braking system.

A dynamic braking system operates to reduce a vehicle's speed, as needed. This is accomplished by a dynamic braking circuit in combination with the traction motors and inverters of the vehicle. In such dynamic braking systems, control software (e.g., the propulsion power control and adhesion control) regulates the performance of the inverters as a function of the combined vehicle power handle position/throttle and grid blower speed.

In operation, the vehicle begins to move when the throttle is controlled to cause the vehicle's speed to increase. At that time, the alternator generates power to the DC link, and the inverters receive and convert the power into a form (e.g., AC) suitable for powering the vehicle's plurality of traction motors. This applied power comprises the vehicle's propulsion voltage.

Upon request for dynamic braking, the dynamic braking system is activated to reduce the speed of the vehicle. For dynamic braking, the inverters are controlled to no longer provide power to the traction motors, and the traction motors are operated as generators. By acting as generators, kinetic energy of the vehicle is converted to electrical power, which slows the vehicle. The power generated by the traction motors (operating as generators) is routed to a grid bank (dynamic braking resistor grid), where the power is dissipated as waste heat. In vehicles with regenerative braking, the power generated during braking may instead be routed for recharging a vehicle battery system. For routing braking-generated electrical power to a grid bank or battery system, the vehicle may include plural dynamic brake contactors. The contactors are high-power, electrically-controlled switches. The contactors are connected, from a control standpoint, to the vehicle control system, which selectively actuates (e.g., turns on or turns off) the contactors to route electrical power to the grid bank (or battery system) as a function of vehicle operational mode (e.g., dynamic braking). A rail vehicle may have between 5-10 contactors on a single car.

Typically, the failure of a contactor assembly can be attributed to a mechanical system component, such as a spring. When there is a system failure, there are typically two options for system repair. The first option includes replacing the entire contactor assembly with a new assembly. The second option includes removing the contactor assembly from the vehicle for repair. Independent of the whether the user decides to repair or replace the contactor assembly, either chosen option can take measurable time and as a result, the vehicle is not available for use. Additionally, the cost to replace a contactor assembly is significantly greater than the cost to replace a system component such as a spring. Currently, however, there is no way to replace and recalibrate individual components with the contactor installed on the vehicle.

It may therefore be desirable to have systems and methods for repairing or calibrating contactor assemblies that differ from existing systems and methods.

BRIEF DESCRIPTION

In one embodiment, a voltage controlling apparatus may include a housing, an ammeter, and a voltage adjustment mechanism. The voltage adjustment mechanism may be configured to be in electrical communication with a power source and a device. The voltage adjustment mechanism may be configured to adjust a voltage being delivered to the device, and the ammeter may be configured to display a corresponding current reading of the device in response to adjustment of the voltage to the device.

In some embodiments, the voltage controlling apparatus may include an actuator that is in electrical communication between the voltage adjustment mechanism and the device. The actuator may be configured to move between a first position and a second position and voltage may be delivered to the device when the actuator is in the second position.

In some embodiments, the device may be a contactor assembly and the contactor assembly may include a contactor and a contact absorbing member mounted with respect to the contactor. The power source and the contactor assembly may be mounted with respect to a machine (e.g., a vehicle).

Another embodiment relates to a method for calibrating a contactor assembly that includes a contactor and a contact absorbing member mounted with respect to the contactor. The contactor assembly may be calibrated by connecting a voltage controlling apparatus to the contactor assembly such that the voltage controlling apparatus provides voltage to the contactor assembly and measures a corresponding current of the contactor assembly. Voltage may be delivered to the contactor assembly to actuate the contactor and the voltage controlling apparatus may measure an actuated current of the contactor. The contact absorbing member may be adjusted relative to the contactor and the contactor may be actuated until the actuated current is achieved.

In some embodiments, the voltage delivered to the contactor assembly may have a magnitude below the required voltage to actuate the contactor. The method may further include adjusting the delivered voltage to a second delivered voltage and the second delivered voltage may actuate the contactor. The actuated current may be measured each time the contact absorbing member is adjusted. The contact absorbing member may be adjusted incrementally relative to the contactor. The contact absorbing member may be a spring. In some instances, the calibration of the contactor assembly may be accomplished while the contactor assembly is mounted with respect to a vehicle.

In another embodiment, a voltage controlling apparatus may include a housing, an ammeter, and a voltage adjustment mechanism. The voltage adjustment mechanism may be configured to be in electrical communication with a power source onboard a vehicle and a contactor assembly. The voltage adjustment mechanism may be configured to adjust a voltage being delivered to the contactor assembly (by the power source), and the ammeter may be configured to display a corresponding current reading of the contactor assembly in response to adjustment of the voltage to the contactor assembly. The contactor assembly may be mounted with respect to the vehicle. The voltage controlling apparatus may be configured to calibrate the contactor assembly while mounted with respect to the vehicle.

DESCRIPTION OF THE DRAWINGS

Features and aspects of embodiments are described below with reference to the accompanying drawings, in which elements are not necessarily depicted to scale.

DETAILED DESCRIPTION

Embodiments disclosed herein relate to a voltage controlling apparatus and methods of calibrating a device. Particularly, exemplary embodiments disclosed herein describe a voltage controlling apparatus and methods of calibrating a contactor assembly. It should be understood, however, that the present disclosure is not limited to the calibration of contactor assemblies. The discussion of calibrating contactor assemblies is intended to illustrate the capabilities of the voltage controlling apparatus and to emphasize one possible use, but in no way is intended to limit the potential uses.

Figure 1:
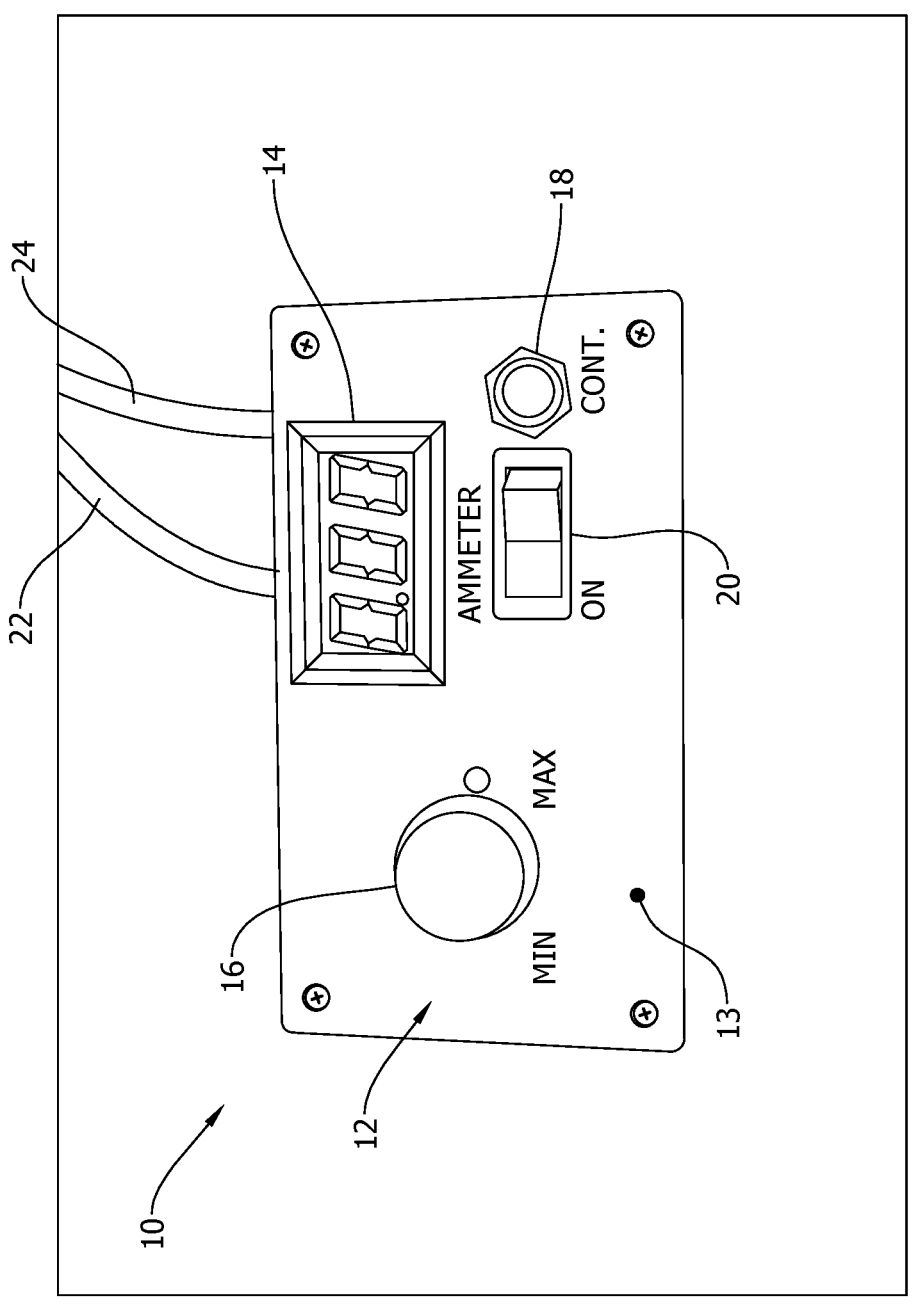
FIG. 1 schematically depicts a top view of an embodiment of a voltage controlling apparatus.
Figure 2:
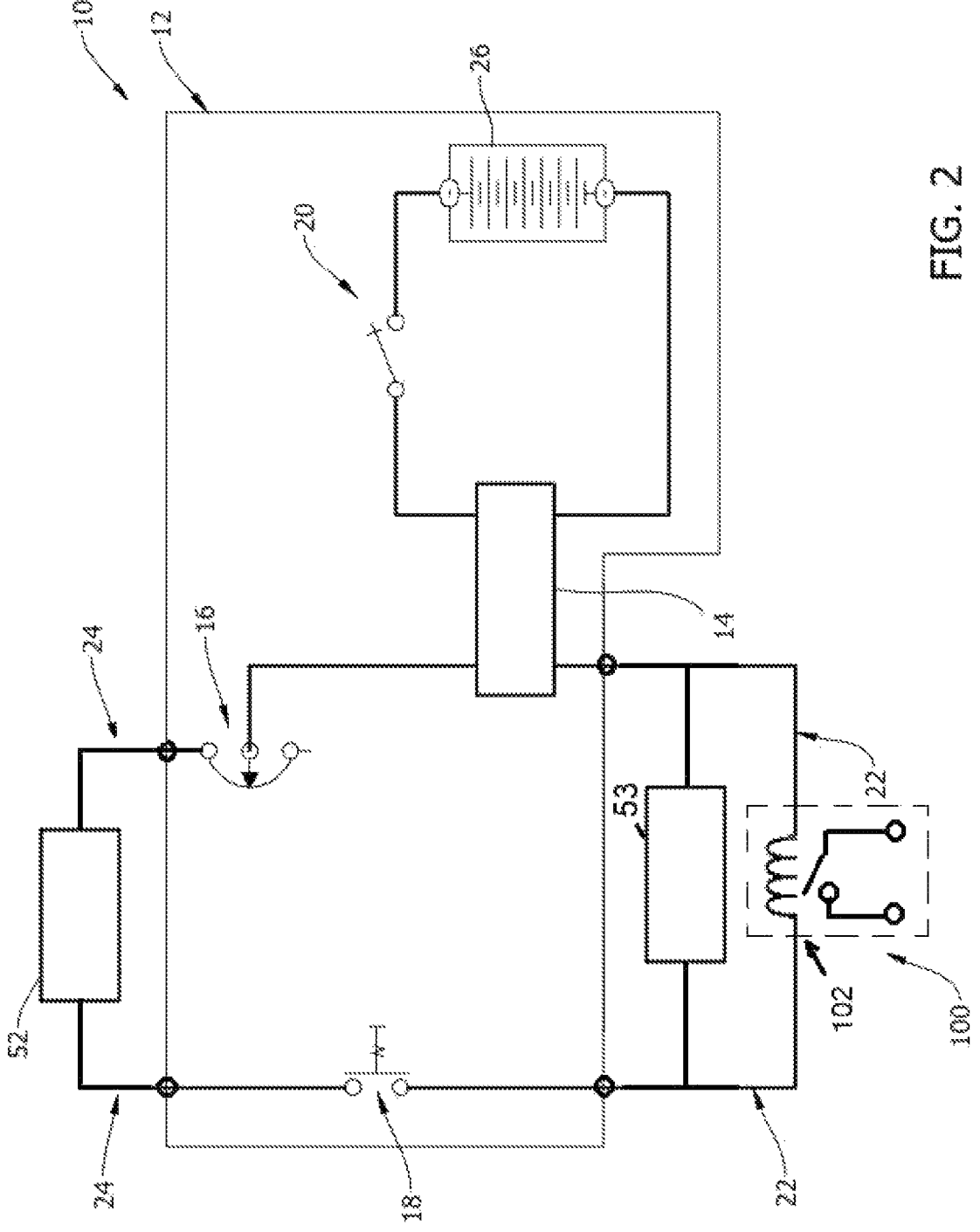
FIG. 2 depicts an electrical schematic of an embodiment of a voltage controlling apparatus and a contactor assembly.

Referring to FIGS. 1 and 2, a voltage controlling apparatus 10 is configured to adjust a voltage being delivered to a device being calibrated (e.g., contactor assembly) and display a corresponding current reading of the device being calibrated in response to the adjusted voltage delivered to the device being calibrated. The voltage controlling apparatus 10 may be configured to be in electrical communication with both a power source and the device being calibrated. The voltage controlling apparatus 10 may include a body or housing 12, an ammeter 14, and a voltage adjustment mechanism 16. Voltage controlling apparatus 10 may include a system switch 20 (e.g., "ON/OFF" switch). The system switch may activate and/or deactivate at least some of the functions of the voltage controlling apparatus 10. For example, the system switch may activate and/or deactivate at least ammeter 14 of voltage controlling apparatus 10.

Body or housing 12 may define a front face 13, a plurality of sidewalls (not shown), and a back face (not shown). The front face may be opposite from the back face. The plurality of sidewalls may extend perpendicularly between the front face and the back face. It should be understood, however, that the body may be embodied in various forms. The identification of the various sides/faces is merely for illustrative purposes to better describe the voltage controlling apparatus.

The ammeter and voltage adjustment mechanism may be at least partially positioned within the body 12. For example, the front face, the back face, and the plurality of sidewalls may define an internal cavity (not shown) and the ammeter and voltage adjustment mechanism may be at least partially positioned within the internal cavity.

Referring to FIG. 2, the voltage controlling apparatus 10 may also include a connection mechanism to position the voltage controlling apparatus in electrical communication with the power source and the device being calibrated. For example, the voltage controlling apparatus may include a load connection interface 22 and a line connection interface 24. The connection interfaces 22, 24 may be a pair of wires (e.g., a positive wire and a negative wire), as shown in FIG. 1, a pair of connectors, and/or combinations thereof. The connection interfaces may be mounted with respect to the body. For example, the connection interfaces may be at least partially mounted with respect to at least one surface (e.g., front face, back face, sidewall) of the body.

The load connection interface 22 may be configured to electrically connect the voltage controlling apparatus 10 to the device being calibrated (e.g., a contactor assembly). The line connection interface 24 may be configured to electrically connect the voltage controlling apparatus with a power source (e.g., a power source onboard a vehicle). The connection interfaces may include additional connection features/components (e.g., spring-loaded clip).

The ammeter 14 may be in electrical communication with at least the power source (e.g., power source onboard a vehicle) and the device being calibrated (e.g., contactor assembly). The ammeter may be mounted with respect to the body 12 such that the ammeter is at least partially visible from the exterior of the body. The ammeter may be configured to calculate and/or record various electrical characteristics of the voltage controlling apparatus 10, the power source, and/or the device being calibrated. For example, current, voltage, wattage, signal, and combinations thereof.

In another embodiment, the ammeter 14 may be displayed and accessible separate from the voltage adjustment mechanism 16. For example, a separate device (e.g., cell phone, computer, downloadable app) may be in electrical communication with voltage controlling apparatus 10 so as to send and/or receive information. The separate device may be in physical and/or wireless electrical connection with the ammeter.

In some examples, the voltage controlling apparatus 10 may include a display screen. In some embodiments and as shown in FIG. 1, the ammeter 14 may include the display screen and may be at least partially visible from the front face 13 of the body 12. The display screen may be configured to display electrical characteristics of the voltage controlling apparatus 10, the power source, and/or the device being calibrated. For example, current, voltage, wattage, signal, and combinations thereof. The display screen may be an LCD screen, as depicted in FIG. 1, an analog display, a series of light-based indicators along a numerical range, or combinations thereof.

In some embodiments, the ammeter 14 may be in electrical communication with a secondary power source 26. As shown in FIG. 2, the secondary power source may be in electrical communication with the ammeter and the system power switch 20. The secondary power source may be separate from the machine's power source (e.g., vehicle battery). The secondary power source may be mounted with respect to (e.g., housed in) the voltage controlling apparatus body 12. For example, the secondary power source may be at least partially mounted with respect to at least one surface (e.g., front face 13, back face, sidewall) of the body and/or at least partially mounted with respect to the internal cavity of the body. The secondary power source may be rechargeable. The secondary power source may be removable from the voltage controlling apparatus body. The secondary power source may have an electrical output in either DC or AC. For example, the secondary power source may have an electrical output of about 9 volts DC. In embodiments, the secondary power source includes a battery. In other embodiments, the secondary power source includes a power supply configured for power attachment to a standard wall outlet, e.g., configured to convert 120 volts AC to 9 volts DC to power the ammeter. In embodiments, the secondary power source includes a rechargeable battery (e.g., 9 volt battery) in the housing, and a power supply that is configured for connection to a standard wall outlet to provide electrical power to recharge the battery and/or to power the ammeter directly (e.g., if the battery is discharged and/or not yet sufficiently recharged to power the ammeter).

The voltage adjustment mechanism 16 may be mounted with respect to the body 12 such that voltage adjustment mechanism is at least partially engageable from the exterior of the body. For example, the voltage adjustment mechanism may be at least partially engageable from the front face 13 of the body. The voltage adjustment mechanism may be configured to adjust at least one electrical characteristic (e.g., voltage, current, resistance, signal) being delivered to a device (e.g., contactor assembly). For example, the voltage adjustment mechanism may be configured to adjust the voltage being delivered to a contactor assembly. The voltage adjustment mechanism may be a dial, as depicted in FIG. 1, a button, at least two buttons (e.g., "INCREASE" and "DECREASE", "MIN" and "MAX"), a slide, a toggle, a switch, and/or combinations thereof.

In some examples, the voltage adjustment mechanism 16 may be adjustable between a first voltage and a second voltage in order to deliver a desired voltage to a contactor assembly. In some embodiments, the first voltage may be a lower magnitude voltage (e.g., minimum voltage) than the second voltage which may be a higher magnitude voltage (e.g., maximum voltage) than the first voltage. In some examples and depending on the device in electrical communication with the voltage controlling apparatus 10, the voltage adjustment mechanism may be adjustable between from about 0 volts to about 100 volts. For example, in instances where the voltage controlling apparatus is used to calibrate a contactor assembly, the voltage adjustment mechanism may be adjustable from about 0 volts to about 74 volts.

In some embodiments, the voltage controlling apparatus 10 may include an activation button 18, e.g., secondary button, slide, toggle, switch, dial, and/or combinations thereof, to activate and/or deactivate the output set by the voltage adjustment mechanism 16. For example, the voltage adjustment mechanism may set a desired voltage output to be received by a device (e.g., contactor assembly) and the activation button 18 may be engaged to deliver the desired voltage output to the device. The activation button may be a toggle button such that moving the activation button in a first direction accomplishes a first task and moving (e.g., releasing) to a second direction accomplishes a second task. Positioning of the activation button may be fully controllable by a user.

In another embodiment, display, activation, and/or other portions of the ammeter and/or the voltage adjustment mechanism may be separate from the body or housing 12. For example, a separate device (e.g., cell phone, computer, downloadable app) may be in electrical communication with portions of the voltage controlling apparatus 10 attached to the body 12, so as to send and receive information. For example, displayable information may be sent to the separate device and adjustments may be made on the separate device and sent to components of the voltage controlling apparatus attached to the body 12. In such embodiments, the voltage controlling apparatus could further include a wireless transceiver in the body configured for wireless communication with a cell phone or other remote device. The wireless transceiver would be electrically coupled to a control unit in the body configured to control the voltage adjustment mechanism (based on control signals received from the remote device) and receive measurements from the ammeter for transmission back to the remote device.

In operation, the voltage adjustment mechanism 16 may be configured to adjust the voltage being delivered to a device being calibrated (e.g., contactor assembly mounted with respect to a vehicle) and the ammeter 14 may be configured to measure and, in some cases, display a corresponding current reading of the device being calibrated in response to adjustment of the voltage to the device being calibrated. As mentioned herein, the activation button 18 may selectively deliver the voltage to the device being calibrated.

Referring to FIG. 2, the illustrated block diagram shows the voltage controlling apparatus 10 in electrical communication with a power source 52 and a device being calibrated (e.g., contactor assembly) 100. The voltage controlling apparatus may be in electrical communication with the power source and/or the contactor assembly through one or more components. For example, in an embodiment, the voltage controlling apparatus may be in electrical communication with a suppression diode 53 which is in electrical communication with (e.g., in parallel to) the power source 52 and contactor assembly 100. For example, the suppression diode may be connected in parallel across the activation coil portion of the contactor assembly.

Although embodiments of the operation and features of voltage controlling apparatus 10 are described with respect to the power source 52, the suppression diode 53, and the contactor assembly 100, in other embodiments one or more of these components may be substituted for other components, and/or some of these components may be lacking, e.g., a vehicle power system may lack a suppression diode, or the apparatus may be used to calibrate a device other than a contactor assembly. The block diagram of FIG. 2 and the drawings of FIGS. 3-9 illustrate an example of one use of voltage controlling apparatus 10 and are not intended to be limiting. The method of use of the voltage controlling apparatus as described herein is an example where the contactor assembly 100 is mounted with respect to a vehicle (e.g., a rail vehicle). However, the contactor assembly does not have to be mounted with respect to a vehicle necessarily for calibration using the voltage controlling apparatus as described herein.

Still referring to FIG. 2, the ammeter 14 may be in electrical communication with the voltage adjustment mechanism 16, the suppression diode 53, and the contactor assembly 100. The voltage adjustment mechanism may be in electrical communication with the power source 52. (Generally speaking, the ammeter and voltage adjustment mechanism are in series with one another, and both are in series with the power source and contactor assembly.) For example, the power source may be one or more batteries of a vehicle (i.e., onboard power source). The line connection interface 24 may electrically connect at least the voltage adjustment mechanism 16 with the power source 52. The ammeter may be in electrical communication with the contactor assembly 100. The load connection interface 22 may electrically connect at least the ammeter with the contactor assembly. The voltage controlling apparatus 10 may include the activation button 18 which may be in electrical communication with both the power supply and the contactor assembly, e.g., connected in series. The line connection interface 24 may electrically connect at least the activation button with the power source. The load connection interface 22 may electrically connect at least the activation button with the contactor assembly. The ammeter 14 may be in electrical communication with the secondary power source 26 and the system switch 20. Load connection interface 22 and/or line connection interface 24 may be at least partially external to the body or housing 12.

Figure 3:
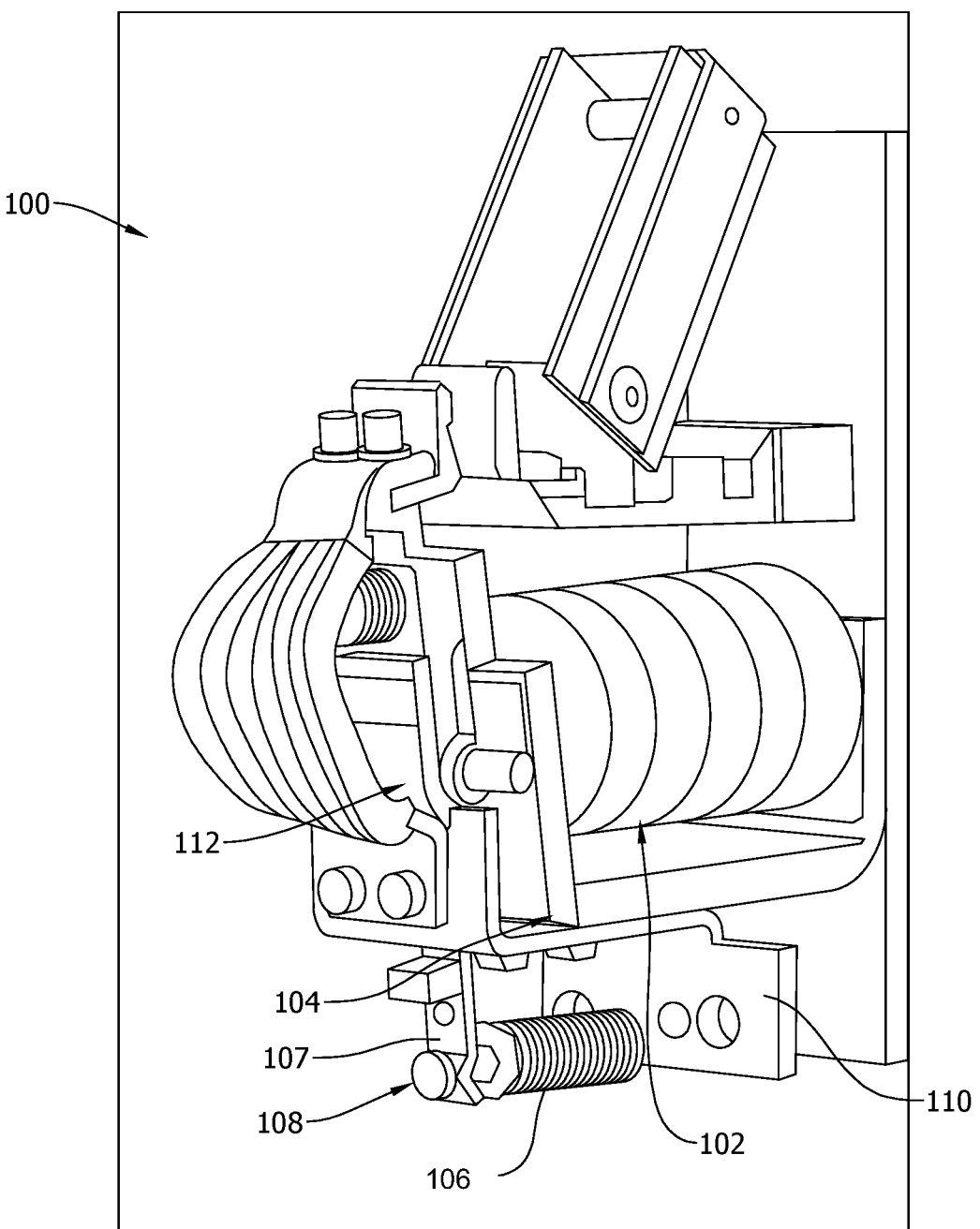
FIG. 3 schematically depicts a contactor assembly configured for use with a dynamic braking system of a vehicle.
Figure 4:
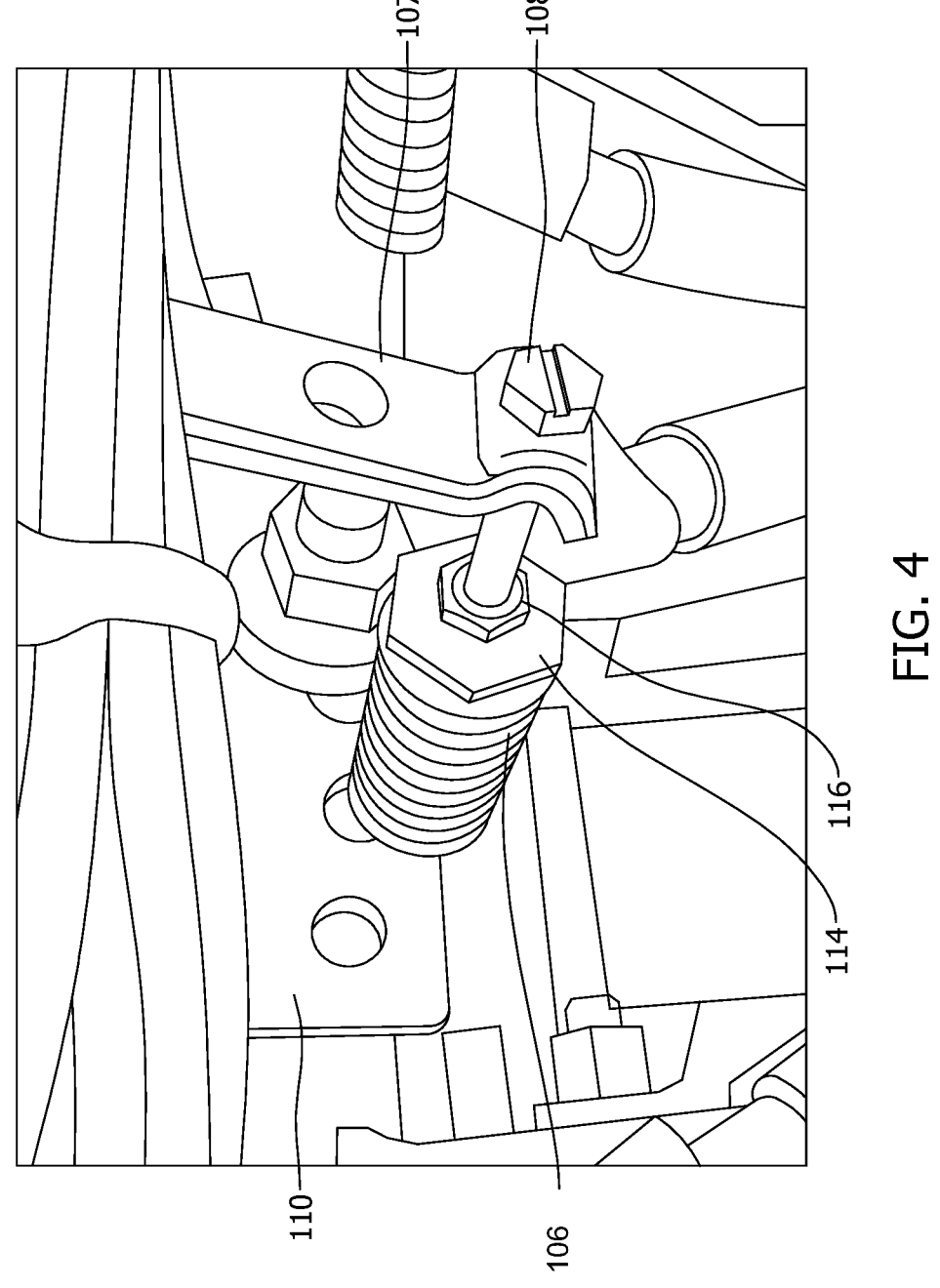
FIG. 4 schematically depicts a perspective view of a spring assembly of the contactor assembly mounted with respect to a vehicle.
Figure 5:
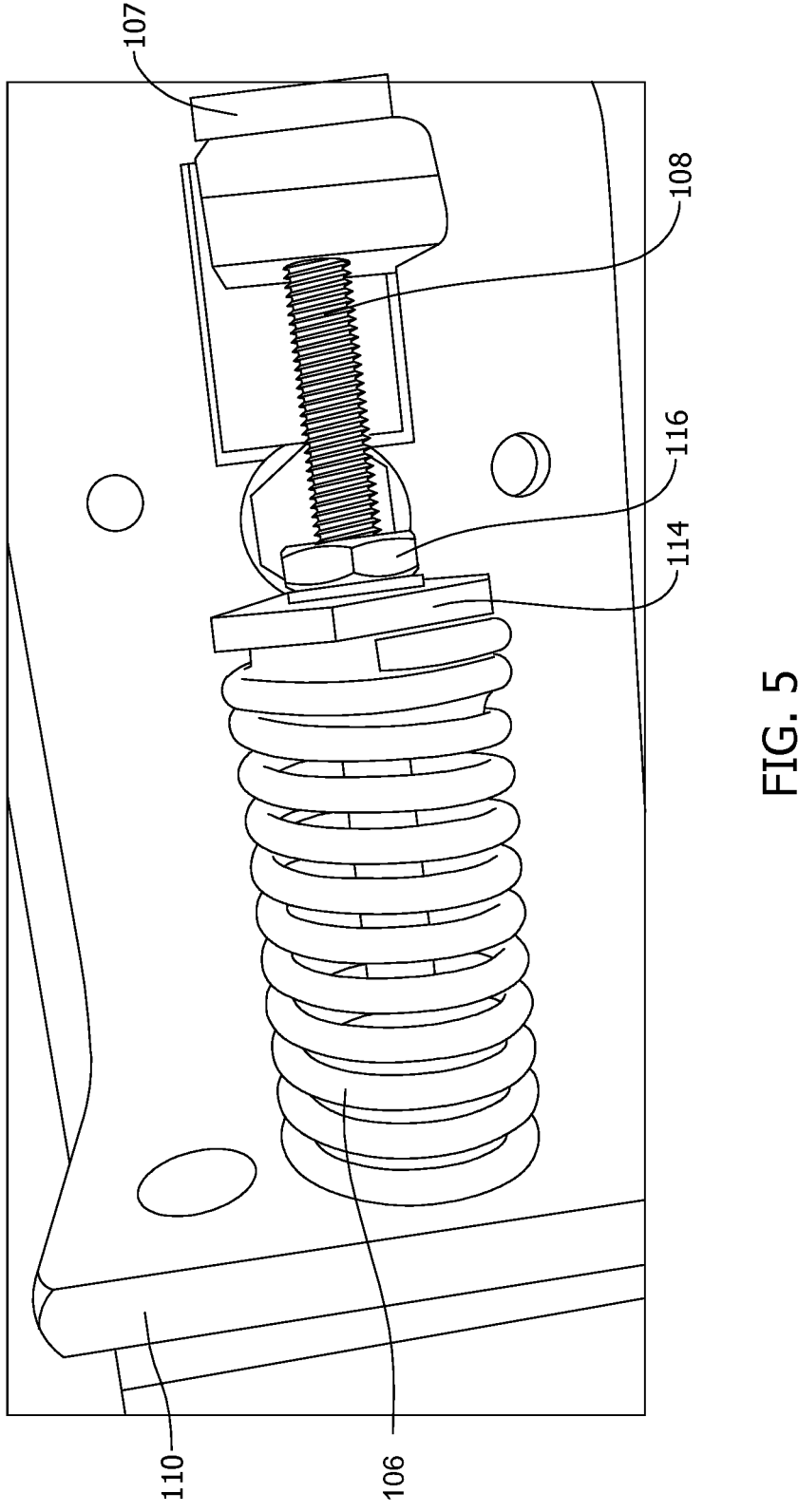
FIG. 5 schematically depicts a bottom view of a spring assembly of the contactor assembly mounted with respect to a vehicle.

FIGS. 3-5 depict the contactor assembly 100, which may be mounted with respect to a vehicle, such as a rail vehicle. The contactor assembly may include a dynamic brake contactor.

Referring to FIG. 3, the contactor assembly 100 may include an operating contactor 102 (e.g., a coil that electromagnetically throws a switch when a control voltage is applied to the coil) mounted with respect to an armature 104, a contact absorbing member (e.g., spring) 106, a calibrating fastener (e.g., bolt) 108, and a contact absorbing member armature 110. For example, the operating contactor may be mounted with respect to the armature 104 such that activation and/or deactivation of the contactor may move (e.g., translate) the armature 104. The armature 104 may move in a first direction until it is in close proximity to (or in contact with) an armature stop 112. The armature stop may be oppositely positioned from the contactor. The armature stop may be mounted with respect to the contact absorbing member armature 110. For example, the armature 104, the armature stop 112, and/or the contact absorbing member armature 110 may be movably connected with one or more of each other. The contact absorbing member armature may be mounted with respect to the contact absorbing member and the calibrating fastener. For example, the contact absorbing member may be mounted with respect to the contact absorbing member armature, which may be mounted with respect to the armature stop, which may be mounted with respect to the armature, which may be mounted with respect to the contactor. The contact absorbing member may directly or indirectly apply resistance (e.g., force) to (or against) the contactor. The calibrating fastener 108 may refine (establish) the amount of resistance that the contact absorbing member applies to the contactor. For example, the amount of resistance may be adjusted for the contact absorbing member to ensure that the contactor returns to a position, as desired, but the resistance level should not be set at a level that prevents the contactor 102 from moving/actuating. Based thereon, the contact absorbing member may be calibrated to the contactor.

FIGS. 4 and 5 depict the contact absorbing member 106 of the contactor assembly 100 mounted with respect to the contact absorbing member armature 110 and in contact with the calibrating fastener 108. The calibrating fastener 108 may be directly or indirectly engaged with a calibrating armature 107 and a contact absorbing member plate 114 and may be threadingly engaged with a locknut 116. For example, the calibrating fastener 108 may directly or indirectly engage with the contact absorbing member plate 114 which may, in turn, compress the contact absorbing member 106. Compression of the contact absorbing member may correlate with calibration of the contactor assembly. For example, calibration of the contact absorbing member 106 may at least partially correspond with the closing amperage of the contactor 102.

The configuration of at least the contact absorbing member 106 and the calibrating fastener 108 is one example of a suitable biasing configuration (e.g., for a contactor assembly). However, embodiments of the voltage controlling apparatus and associated method(s) as described herein may be used for calibrating devices having other biasing configurations.

In one embodiment, the operation of calibrating a contactor assembly 100 includes electrically connecting the voltage controlling apparatus 10 to the contactor assembly. For example, the voltage controlling apparatus may be configured to provide voltage to the contactor assembly and measure a corresponding current of the contactor assembly (when the voltage is applied). The voltage controlling apparatus may provide the voltage to the contactor assembly to actuate the contactor 102 and in doing so, the voltage controlling apparatus may measure an actuated current of the contactor 102 using the ammeter 14. For example, the ammeter may be configured to read (measure) (and, in embodiments, display) the corresponding current reading of contactor assembly 100 in response to adjustment of the contact absorbing member 106. For example, the calibrating fastener 108 may compress or decompress the contact absorbing member to increase or decrease the current output from the contactor. The voltage controlling apparatus may provide subsequent voltage to the contactor assembly and measure the corresponding current of the contactor. The contact absorbing member may be further adjusted, along with actuation/measurement of the contactor, until a desired current output is achieved. To calibrate the contactor assembly 100, the position/orientation of the contact absorbing member 106 is adjusted to ensure that the contactor 102 opens (i.e., picks up) at a desired threshold, but when actuated, can overcome the contact absorbing member and close.

Turning to FIGS. 6-9, the voltage controlling apparatus 10 may be used to calibrate the contactor assembly 100. An embodiment of the method of calibration is conducted with the contactor assembly installed on a vehicle. Doing so can reduce the time required to replace and calibrate the contact absorbing member 106 and save costs by limiting downtime of the vehicle and by not having to replace the entire contactor assembly.

Figure 6:
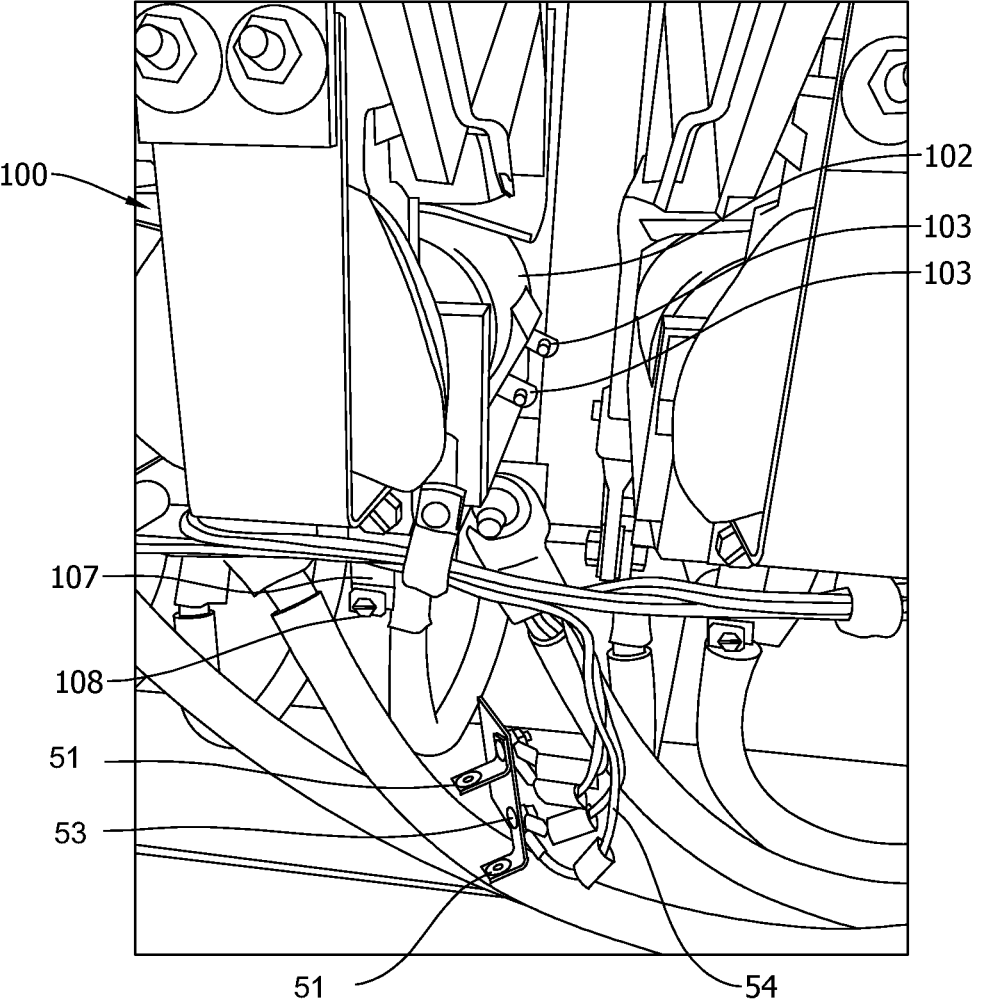
FIG. 6 schematically depicts a side view of a vehicle with a suppression diode removed from the contactor assembly.

Referring to FIG. 6, when calibrating the contactor, the suppression diode 53 is removed from its parallel connection across the terminals of the coil of the contactor 102 of the contactor assembly 100. Removing the suppression diode from the contactor 102 may include mechanical removal, electrical disconnection, and combinations thereof. As noted above and with reference to FIG. 2, the suppression diode 53 may be in electrical communication with a power supply 52 of the vehicle. For example, the suppression diode 53 may be directly/indirectly engaged with the power supply of the vehicle via one or more electrical cables 54, as depicted.

Figure 7:
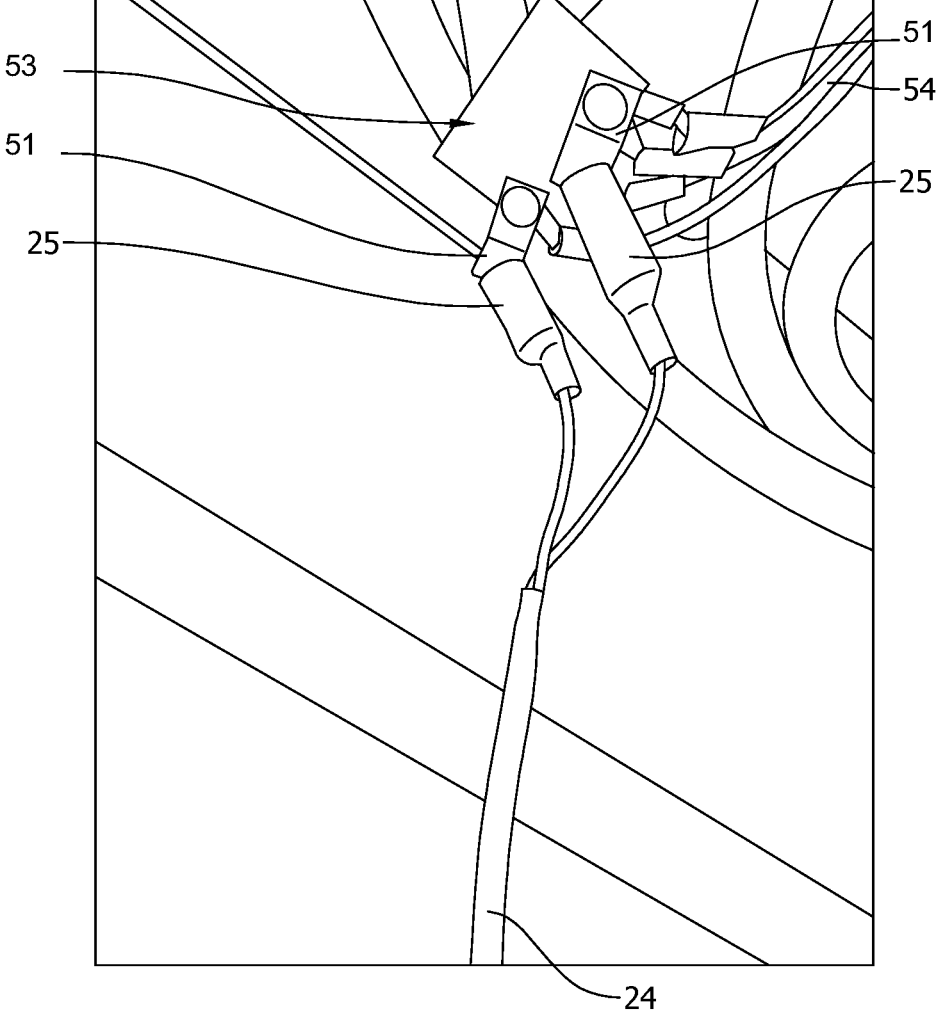
FIG. 7 schematically depicts a suppression diode of the contactor assembly in electrical communication with the voltage controlling apparatus.

Referring to FIG. 7, the line connection interface 24 of the voltage controlling apparatus 10 is connected to the suppression diode 53 (which is already connected to the power source 52). The line connection interface 24 may include a wire with a designated positive connection and a wire with a designated negative connection, i.e., two leads, both terminated by respective spring-loaded metal clips 25 (e.g., alligator clips, crocodile clips, center-spring clips, etc.) for detachable electrical connection with suppression diode terminals 51 (e.g., two terminals). Electrically connecting the voltage controlling apparatus 10 to the suppression diode 53 provides power from the vehicle to the voltage controlling apparatus, at least in the sense that the voltage controlling apparatus can control the voltage applied to the contactor coil once the voltage controlling is additionally electrically coupled to the contactor coil terminals.

Figure 8:
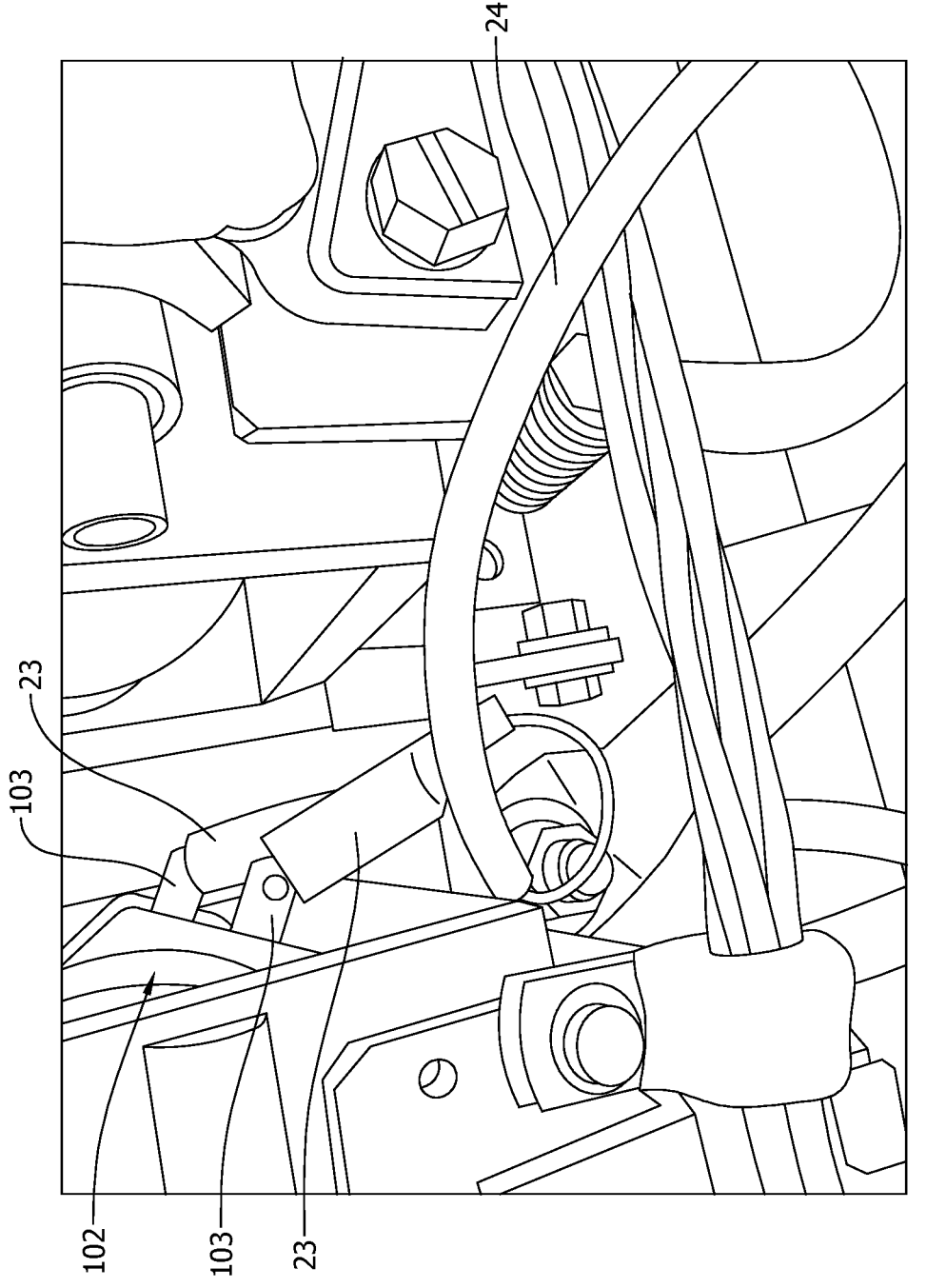
FIG. 8 schematically depicts a contactor of the contactor assembly in electrical communication with the voltage controlling apparatus.

Referring to FIG. 8, the load connection interface 22 of voltage controlling apparatus 10 is connected to the terminals 103 of the contactor 102 coil. The load connection interface 22 may include a wire with a designated positive connection and a wire with a designated negative connection, i.e., two leads, both terminated by respective spring-loaded metal clips 23, for detachable electrical connection with the contactor coil terminals 103 (e.g., two terminals). Electrically connecting the voltage controlling apparatus 10 to the contactor coil terminals 103 completes the electrical circuit between the contactor 102, suppression diode 53, and power source 52 and the voltage controlling apparatus 10 therebetween.

Figure 9:
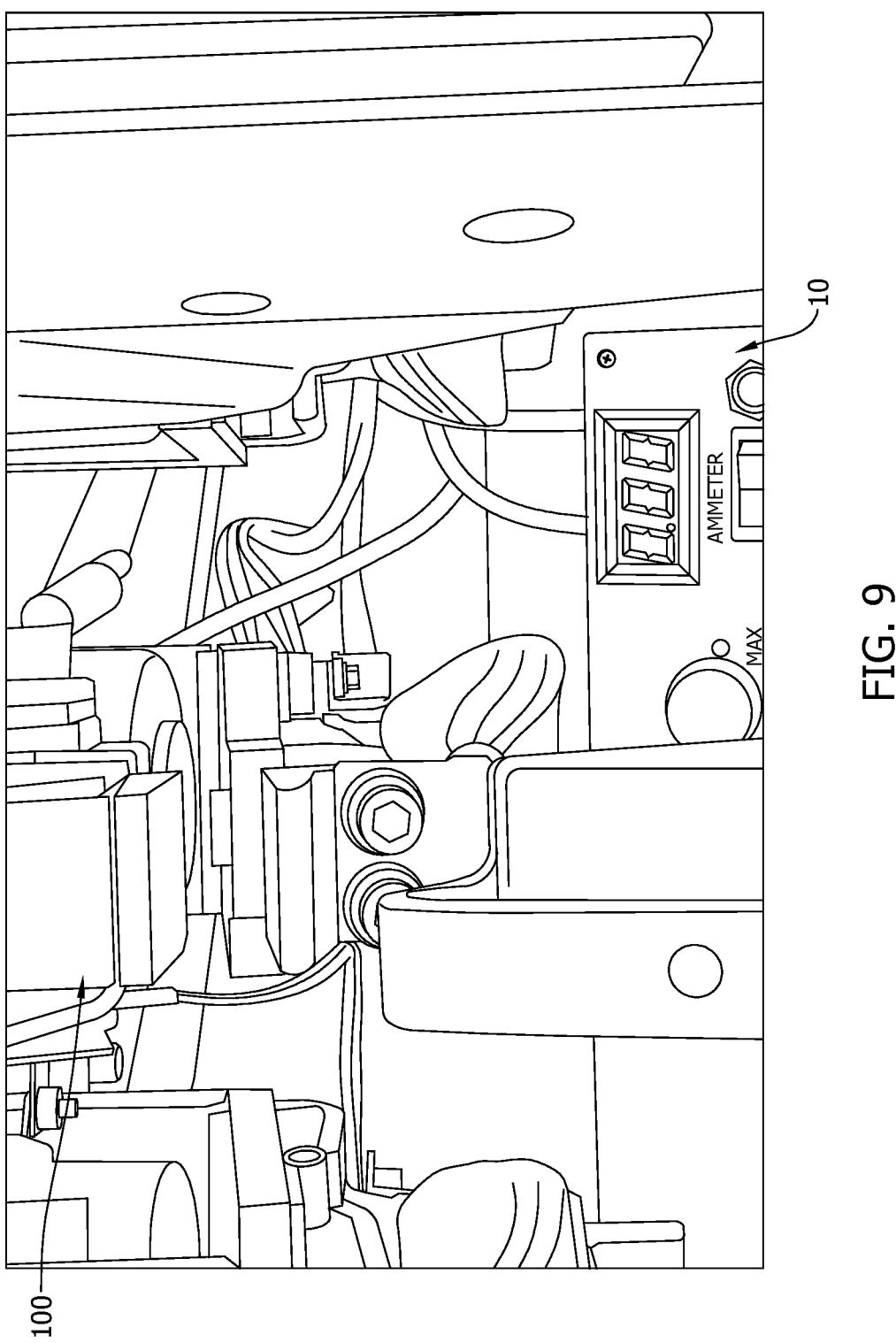
FIG. 9 schematically depicts an embodiment of a voltage controlling apparatus in electrical communication with a contactor assembly mounted with respect to a vehicle.

Alternatively, the load connection interface 22 may be connected to the contactor 102 before the line connection interface 24 is connected to the suppression diode 53. FIG. 9 depicts the voltage controlling apparatus 10 positioned with respect to the contactor assembly 100 while the contactor assembly 100 is mounted to a vehicle.

Figure 10B:
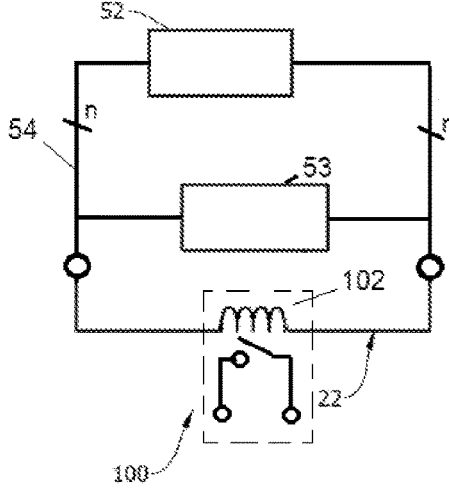
FIG. 10A, FIG. 10B, and FIG. 10C are schematic illustrations of embodiments of a voltage controlling apparatus, contactor assembly, and power source.
Figure 10A:
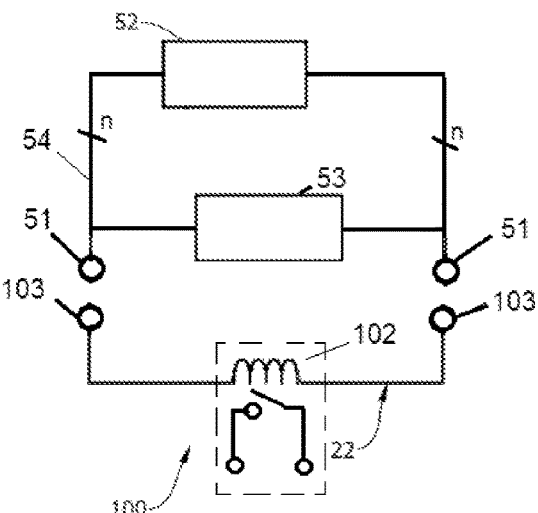
Figure 10C:
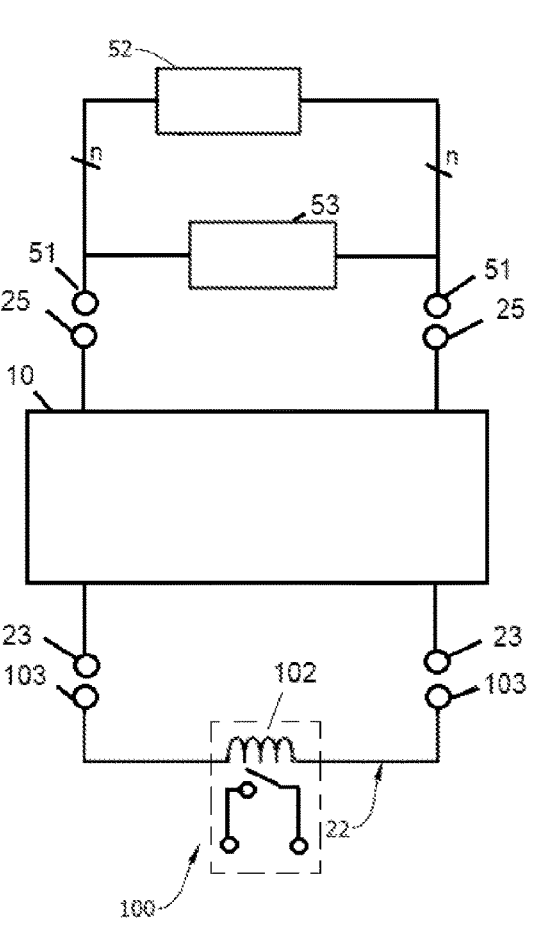

Aspects of FIGS. 6-9 are illustrated schematically in FIGS. 10A, 10B, and 10C. As indicated in FIG. 10A, the coil of contactor 102 has the two terminals 103. The suppression diode 53 has the two terminals 51, and is also electrically connected to the power source 52 by cable/wires 54. As shown in FIG. 10B, the suppression diode may be electrically attached in parallel to the contactor coil by bringing its terminals 51 into contact to engage the terminals 103 of the contactor coil, i.e., the terminals may all be spaced and configured for the diode to "plug into" the coil terminals. Electrically connecting the diode across the coil concurrently connects the coil to the power source. For temporary attachment of the voltage controlling apparatus 10 for calibrating the contactor assembly, the diode is detached from across the coil (e.g., it is transitioned from the state illustrated in FIG. 10B to the state illustrated in FIG. 10A). Then, the voltage controlling apparatus is interposed and electrically connected to the diode and coil as shown in FIG. 10C, using clips 25 for attachment to diode terminals 51 and clips 23 for attachment to coil terminals 103. (The power source 52 may be stationary, whereas the diode 53 may be moveable due to be detachable from the contactor coil and connected to the power source via flexible cable/wires.)

In some instances, the contactor 102 may be activated (e.g., "pick up") by a control on the vehicle. For example, the vehicle may include a self-test feature where individual components (e.g., contactor 102) may be turned on and/or off from a central display. (This may be in addition to a control function that controls the contactor 102 during normal use of the vehicle, e.g., during dynamic braking.) In other instances, contactor 102 may be activated by a separate control and power supply that is independent of the vehicle. The separate power supply may or may not require an "ON/OFF" switch to activate the contactor 102. In embodiments, the power source 52 includes, or is connected to, a control unit (e.g., vehicle control unit) that is configured to apply a designated voltage to the contactor coil under designated circumstances or responsive to the occurrence of designated criteria. In such an embodiment, as part of the process for using the voltage controlling apparatus to calibrate a contactor assembly, the control unit is controlled to apply a voltage from the power source to the circuit that includes the contactor assembly, with the voltage controlling apparatus controlling and modifying the voltage as applied to the contactor, as described herein.

With the voltage controlling apparatus 10 electrically connected to the suppression diode 53, the power source 52, and the coil of contactor 102, the voltage controlling apparatus may be activated (turned ON) by a user manipulating the system power switch 20. The switch 20 may activate ammeter 14 using, in some embodiments, power from power supply 26.

With the voltage controlling apparatus 10 turned on, the voltage adjustment mechanism 16 is adjusted to a first voltage (e.g., lower voltage) and the contactor 102 is activated using the activation button 18. The first voltage may provide a baseline for contactor 102. In response to delivering the first voltage, ammeter 14 may display the associated current of contactor 102.

The voltage adjustment mechanism 16 is then adjusted to a second voltage. The second voltage (e.g., higher voltage) may cause the contactor 102 to close. In response to delivering the second voltage, the ammeter 14 may display the associated current of the contactor 102. For example, the associated closing current of contactor 102. If the second voltage did not cause contactor 102 to close (or only partially close), a subsequent voltage may be provided to cause the contactor 102 to close. The ammeter 14 may display the associated current of contactor 102 with regard to the subsequent voltage.

To calibrate the contactor assembly 100, the orientation and/or position of the contact absorbing member 106 is adjusted to ensure the contactor 102 opens (i.e., picks up) at a desired threshold. The desired threshold may be the current reading of the contactor. For example, the desired pick up of the contactor may be about 0.33 amps.

The contact absorbing member 106 may be adjusted to ensure the contactor 102 closes at desired threshold (e.g., voltage and/or current). After adjustment of the contact absorbing member, voltage may be applied to the contactor 102 and the associated current may be measured and cross-referenced with the desired current threshold. For example, after each adjustment voltage may be applied to the contactor and the associated current may be measured and cross-referenced with the desired threshold.

Depending on the measured current, further adjustments may be made to the contact absorbing member 106. For example, if the closing amps of the contactor 102 are above the desired threshold, the calibrating fastener 108 may be loosened such that the contact absorbing member 106 is less compressed. In another example, if the closing amps of the contactor are below the desired threshold, the calibrating fastener may be tightened such that contact absorbing member is more compressed. The degree of adjustment of the calibrating fastener may be more or less than 1 full rotation. For example, the degree of adjustment of the calibrating fastener may be about one-half of a full rotation. In some embodiments, the calibrating fastener may include feature(s) that limit the degree of adjustment. For example, the calibrating fastener may include feature(s) that limit the degree of adjustment to about one-half (½) rotation.

Once the desired calibration of the contact absorbing member 106 is set, the locknut 116 may be tightened to semi-permanently secure (i.e., lock) the contact absorbing member in the desired position. The locknut may be tightened against the contact absorbing member plate 114, which may be at least partially engaged with the contact absorbing member.

The contactor 102 is typically in an open position such that the contact absorbing member 106 pushes against the contactor with enough force (e.g., spring force) that the contactor remains open. Once the coil of the contactor is actuated (e.g., energized), the contactor overcomes the force of the contact absorbing member and moves into a closed position. Then, to open the contactor, the coil of the contactor is de-actuated (e.g., deenergized) and the force of contact absorbing member pushes against the contactor into an open position. The force (e.g., spring force, spring tension) is calibrated to a particular level that corresponds to the contactor activation signal. For example, the activation signal may be the voltage and/or current of the contactor. In one example, the contact absorbing member 106 may be calibrated such that activation of the contactor 102 overcomes the force of the contact absorbing member with minimal energy.

According to one aspect, the contact absorbing member 106 may be replaced without the need to remove the entire contactor assembly 100. When the contact absorbing member (e.g., spring) breaks, the contactor 102 cannot stay fully open as there is not enough force (e.g., spring force) to push against the contactor. Typically, the entire contactor assembly is replaced as it is not cost effective to remove the contactor assembly from the vehicle to replace and calibrate the contact absorbing member. That is because to date, calibration of the replaced contact absorbing member while the contactor assembly is mounted to the vehicle has not been feasible.

This written description uses examples to disclose several embodiments of the subject matter herein, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. As used herein, "a", "an", and "the" refer to both singular and plural referents unless the context clearly dictates otherwise.

As used herein, the term "about" refers to a measurable value such as a parameter, an amount, a temporal duration, and the like and is meant to include variations of +/−15% or less, preferably variations of +/−10% or less, more preferably variations of +/−5% or less, even more preferably variations of +/−1% or less, and still more preferably variations of +/−0.1% or less of and from the particularly recited value, in so far as such variations are appropriate to perform in the disclosure described herein. Furthermore, it is also to be understood that the value to which the modifier "about" refers is itself specifically disclosed herein.

As used herein, spatially relative terms, such as "beneath", "below", "lower", "above", "upper", "front", "back", "side", "left", "right", "rear", and the like, are used for ease of description to describe one element or feature's relationship to another element(s) or feature(s). It is further understood that the terms "front", "back", "left", and "right" are not intended to be limiting and are intended to be interchangeable, where appropriate. Further, it should be noted that the terms "first," "second," and the like herein do not denote any order, quantity, or relative importance, but rather are used to distinguish one element from another. Unless otherwise stated, the terms "body" and "housing" are synonymous for any structure that can support components of a device.

As used herein, the terms "comprise(s)", "comprising", and the like, specify the presence of stated features, integers, steps, operations, elements, and/or components, but do not preclude the presence or addition of one or more other features, integers, steps, operations, elements, components, and/or groups thereof.

As used herein, the terms "configure(s)", "configuring", and the like, refer to the capability of a component and/or assembly, but do not preclude the presence or addition of other capabilities, features, components, elements, operations, and any combinations thereof.

All ranges disclosed herein are inclusive of the endpoints, and the endpoints are independently combinable with each other. Each range disclosed herein constitutes a disclosure of any point or sub-range lying within the disclosed range.

All methods described herein can be performed in any suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure or any embodiments unless otherwise claimed.

Reference to a specific form of transportation/machinery (e.g., a vehicle) is intended merely to provide context to the disclosure and does not pose a limitation on the scope of the disclosure or any applications thereof, unless otherwise claimed.

What is claimed is:

1. A voltage controlling apparatus comprising:
a voltage adjustment mechanism, in electrical communication with a power source and a contactor assembly onboard a vehicle, the voltage adjustment mechanism configured to adjust a voltage being delivered to the contactor assembly from the power source, wherein the contactor assembly comprises a coil, contact absorbing member, and a calibrating fastener;
an ammeter, in electrical communication with the contactor assembly, configured to display a current reading of the contactor assembly in response to adjustment of the voltage to the contactor assembly, wherein the calibrating fastener is configured to adjust an amount of force that the contact absorbing member applies to the coil; and
a housing for the voltage adjustment mechanism and the ammeter.

2. The voltage controlling apparatus of claim 1, wherein the voltage controlling apparatus enables calibration of the contactor assembly while the contactor assembly is mounted with respect to the vehicle.

3. The voltage controlling apparatus of claim 1, wherein the voltage adjustment mechanism comprises a variable resistor.

4. The voltage controlling apparatus of claim 3, further comprising a circuit and a first pair of leads configured for electrically connecting the circuit to the power source and a second pair of leads configured for electrically connecting the circuit to the coil, the circuit comprising the ammeter and the variable resistor electrically connected in series.

5. The voltage controlling apparatus of claim 4, wherein the ammeter and the variable resistor are at least partially housed together in the housing, and wherein the first pair of leads and the second pair of leads extend from respective electrical connections within the housing to outside of the housing for respective attachment to the coil and the power source, and wherein the variable resistor includes an actuator positioned on an external surface of the housing for user adjustment of the variable resistor by a user, and the ammeter includes a display positioned on the external surface of the housing and configured to display the current reading to the user.

6. The voltage controlling apparatus of claim 5, further comprising at least one of a battery or a power supply in the housing and a first switch attached to the housing and configured to selectively connect and disconnect the ammeter from said at least one of the battery or the power supply, and said at least one of the battery or the power supply configured to power the ammeter to measure and display the current reading.

7. The voltage controlling apparatus of claim 6, further comprising a second switch attached to the housing, the second switch being normally open and configured, when closed and concurrent with the first pair of leads and the second pair of leads respectively attached to the coil and the power source, to establish an electrical connection between the ammeter, the variable resistor, the coil, and the power source.

8. The voltage controlling apparatus of claim 1, wherein the coil is in electrical communication with the voltage adjustment mechanism.

9. The voltage controlling apparatus of claim 8, wherein the coil is configured to move between a first position and a second position and wherein the voltage is delivered to the contactor assembly when the coil is in the second position.

\* \* \* \* \*